United States Patent
Miyahara et al.

(10) Patent No.: US 7,224,367 B2
(45) Date of Patent: May 29, 2007

(54) FACE INFORMATION TRANSMISSION SYSTEM

(75) Inventors: Saori Miyahara, Matsudo (JP); Akira Matsuki, Machida (JP); Yukiko Tozawa, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 195 days.

(21) Appl. No.: 10/748,248

(22) Filed: Dec. 31, 2003

(65) Prior Publication Data

US 2004/0207720 A1    Oct. 21, 2004

(30) Foreign Application Priority Data

Jan. 31, 2003   (JP)   ............ P2003-024734

(51) Int. Cl.
*G06T 13/00*   (2006.01)
(52) U.S. Cl. .................. 345/473; 345/619
(58) Field of Classification Search .......... 345/473
See application file for complete search history.

(56) References Cited

U.S. PATENT DOCUMENTS

| | | | |
|---|---|---|---|
| 5,426,460 A | | 6/1995 | Erving et al. |
| 5,995,119 A | * | 11/1999 | Cosatto et al. ............ 345/473 |
| 6,654,018 B1 | * | 11/2003 | Cosatto et al. ............ 345/473 |
| 6,885,761 B2 | * | 4/2005 | Kage .................... 382/118 |
| 2001/0051535 A1 | | 12/2001 | Kamimura et al. |
| 2002/0118195 A1 | | 8/2002 | Paetzold et al. |

FOREIGN PATENT DOCUMENTS

| | | |
|---|---|---|
| EP | 1 221 673 A2 | 7/2002 |
| JP | 10-149433 | 6/1998 |
| JP | 2001-076164 | 3/2001 |
| JP | 2002-199362 | 7/2002 |
| JP | 2003-16475 | 1/2003 |
| WO | WO 01/45089 | 6/2001 |

OTHER PUBLICATIONS

S. Kshirsagar, et al., Proceedings IEEE Virtual Reality, XP-010535482, pp. 37-44, "Personalized Face and Speech Communication Over the Internet", Mar. 13, 2001.

* cited by examiner

*Primary Examiner*—Ulka Chauhan
*Assistant Examiner*—Said Broome
(74) *Attorney, Agent, or Firm*—Oblon, Spivak, McClelland, Maier & Neustadt, P.C.

(57)  ABSTRACT

An object is to provide a face information transmission system enabling the generation of images with a high possibility of reflecting such elements as the feelings and intentions of a user. A mobile phone, as such a face information transmission system, comprises an image acquisition part to acquire images of a face of a subject; a first generation part to generate first image information relating to the subject and including the positions of characteristic points of the face based on the acquired images; a second generation part to generate a character image according to the facial expression of the face of the subject based on the generated first image information; and a transmission part to transmit the generated character image to another mobile phone.

19 Claims, 7 Drawing Sheets

| PHONEME | CHARACTERISTIC POINT DATA | CHARACTER IMAGE |
|---|---|---|
| KO | o °o o | |
| N | o 8 o | |
| NI | o  8  o | |
| CHI | o  8  o | |
| WA | o  o  o<br>o | |
| ⋮ | ⋮ | ⋮ |

FACE INFORMATION TRANSMISSION SYSTEM

BACKGROUND OF THE INVENTION

1. Field of the Invention

This invention relates to a face information transmission system.

2. Description of the Related Art

With the spread of electronic mail, there are an increasing number of cases in which various image information is transmitted in addition to simple text information. As one mode for the transmission of image information, there exists technology to acquire an image of the face of a user (a subject), and to transform the face image into another image according to a specified facial expression (see for example Japanese Patent Laid-open No. 10-149433).

SUMMARY OF THE INVENTION

However, some users, while hesitant to transmit an unaltered image of their own face, would like to transmit the image of a character that reflects such elements as their own feelings and intentions. Although the technology of the prior art enables transformation of an image of the face of a subject according to a specified facial expression, there is the problem that an image cannot be created based on the facial expression of a user and reflecting such elements as feelings and intentions.

Hence one object of this invention is to provide a face information transmission system which enables the generation of images with a high possibility of reflecting such elements as the feelings and intentions of a user.

A face information transmission system of this invention comprises image acquisition means to acquire an image of the face of a subject; first generation means to generate first image information relating to the subject, including the positions of characteristic points of the face, based on the acquired image; second generation means to generate second image information, according to the facial expression of the face of the subject, based on the generated first image information; and, transmission means to transmit the generated second image information to a prescribed communication terminal.

By means of a face information transmission system of this invention, second image information is generated according to the facial expression of the face of the subject, based on first image information, generated based on the positions of characteristic points, so that image information which captures the facial expression of the face of the subject can be generated. Facial expressions often reflect such elements as the feelings and intentions of the subject, and so an image with a high possibility of reflecting such elements can be generated and transmitted, as second image information, to a prescribed communication terminal.

Also, it is preferable that a face information transmission system of this invention further comprise utterance acquisition means to acquire an utterance issued by the subject, and image judgment means to judge whether first image information satisfies prescribed conditions; and [it is preferable] that when, as a result of judgment by the image judgment means, the first image information satisfies prescribed conditions, the second generation means generates second image information according to the facial expression of the face of the subject, based on at least the first image information, and when the first image information does not satisfy prescribed conditions, [the second generation means] generates second image information according to the facial expression of the face of the subject, based on an utterance. When the first image information does not satisfy the prescribed conditions, the second image information is generated according to the facial expression of the face of the subject based on an utterance, so that, for example, even if for some reason measurements of the positions of characteristic points of the face of the subject are incomplete, the second image information can be generated.

Also, it is preferable that a face information transmission system of this invention further comprise phoneme identification means to identify phonemes corresponding to utterances acquired by the utterance acquisition means, and phoneme judgment means to judge whether an identified phoneme satisfies prescribed conditions; and [it is preferable] that when, as a result of judgment by the phoneme judgment means, a phoneme satisfies prescribed conditions, second image information is generated according to the facial expression of the face of the subject, based on, at least, the phoneme, and that when the phoneme does not satisfy prescribed conditions, the second image information be generated according to the facial expression of the face of the subject, based on the first image information. When the phoneme does not satisfy the prescribed conditions, the second image information is generated according to the facial expression of the face of the subject, based on the first image information and/or an utterance, so that even if, for example, a phoneme cannot be identified for some reason, second image information can be generated.

Also, it is preferable that in a face information transmission system of this invention, when neither the first image information nor a phoneme satisfy respective prescribed conditions, and moreover an utterance cannot be acquired, the second generation means employs image information determined in advance as the second image information. Depending on conditions, a case in which an utterance also cannot be acquired can be posited; but even in such a case, if image information determined in advance is used, second image information can be generated.

Also, it is preferable that in a face information transmission system of this invention, the first image information comprise information identifying the distribution of characteristic points in the face of the subject. If the distribution of characteristic points in the face is identified, the relative positional relationships between characteristic points can be grasped, so that more appropriate second image information can be generated.

Also, it is preferable that in a face information transmission system of this invention, the image acquisition means acquire an image of a face along a time series, and that the first generation means generate first image information, including displacements in the positions of characteristic points along the time series based on the acquired image. By generating first image information based on displacements of the positions of characteristic points measured along the time series, changes in the facial expression of the face of the subject can be grasped as changes in the positions of characteristic points. Hence second image information can be generated according to changes in the facial information.

Also, it is preferable that in a face information transmission system of this invention, first image information include information identifying the movement of characteristic points relative to the face of the subject. The movement of characteristic points relative to the face can be identified along a time series, so that changes in the facial expression of the face of the subject can be grasped more accurately.

BRIEF DESCRIPTION OF THE DRAWINGS

The present invention may be more readily described with reference to the accompanying drawings, in which.

DESCRIPTION OF THE PREFERRED EMBODIMENTS

Information of this invention can easily be understood through consideration of the following detailed description while referring to the attached drawings, which are provided only for illustration. Aspects of this invention are then explained, referring to the attached drawings. Where possible, the same components are assigned the same symbols, and redundant explanations are omitted.

Figure 1:
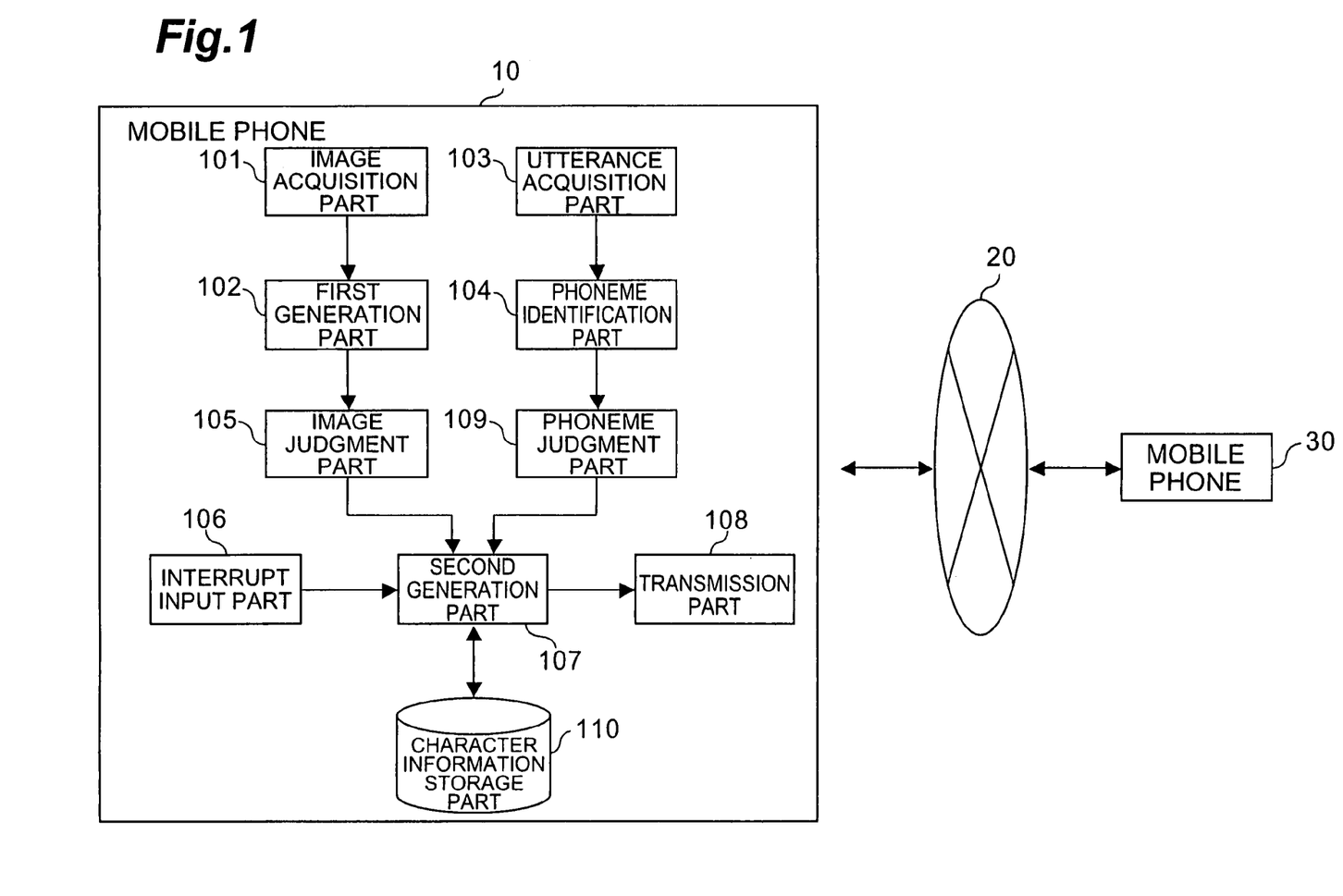
FIG. 1 is a drawing to explain the face information transmission system which is an aspect of this invention.

An explanation is given, using FIG. 1, for a mobile phone (face information transmission system) which is an aspect of this invention. FIG. 1 is a drawing to explain the mobile phone 10. The mobile phone 10 is configured to enable mutual communication of information with another mobile phone (communication terminal) 30 via a network 20.

Next, the mobile phone 10 is explained. The mobile phone 10 physically is configured as a mobile phone capable of information communication and comprising a CPU (central processing unit), memory, input devices such as buttons and a microphone, a display device such as a liquid crystal display, an image acquisition device such as a camera, and similar.

The mobile phone 10 comprises, as functional components, an image acquisition part (image acquisition means) 101; first generation part (first generation means) 102; utterance acquisition part (utterance acquisition means) 103; phoneme identification part (phoneme identification means) 104; image judgment part (image judgment means) 105; interrupt input part 106; second generation part (second generation means) 107; transmission part (transmission means) 108; phoneme judgment part (phoneme judgment means) 109; and character information storage part 110. Next, each of the components is explained in detail.

The image acquisition part 101 is a part which acquires images of the face of the user, as the subject, of the mobile phone 10. The images of a face acquired by the image acquisition part 101 may be instantaneous (a static image), or may be along a time series (moving images or video). The image acquisition part 101 outputs acquired images to the first generation part 102.

Figure 2A:
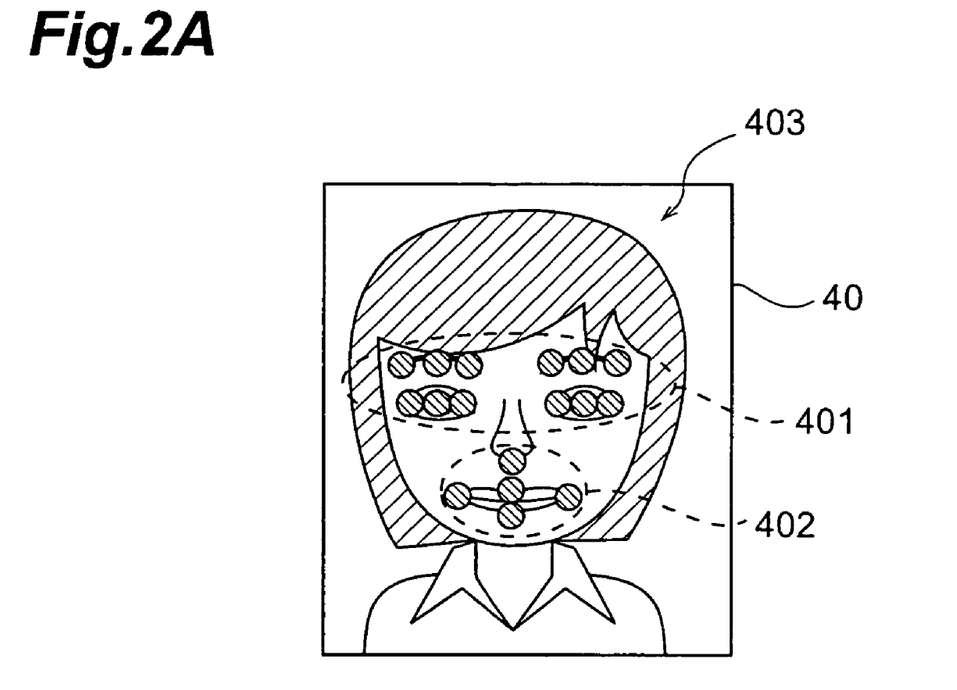
FIG. 2A shows an example of a face image acquired by a face information transmission system which is an aspect of this invention.
Figure 2B:
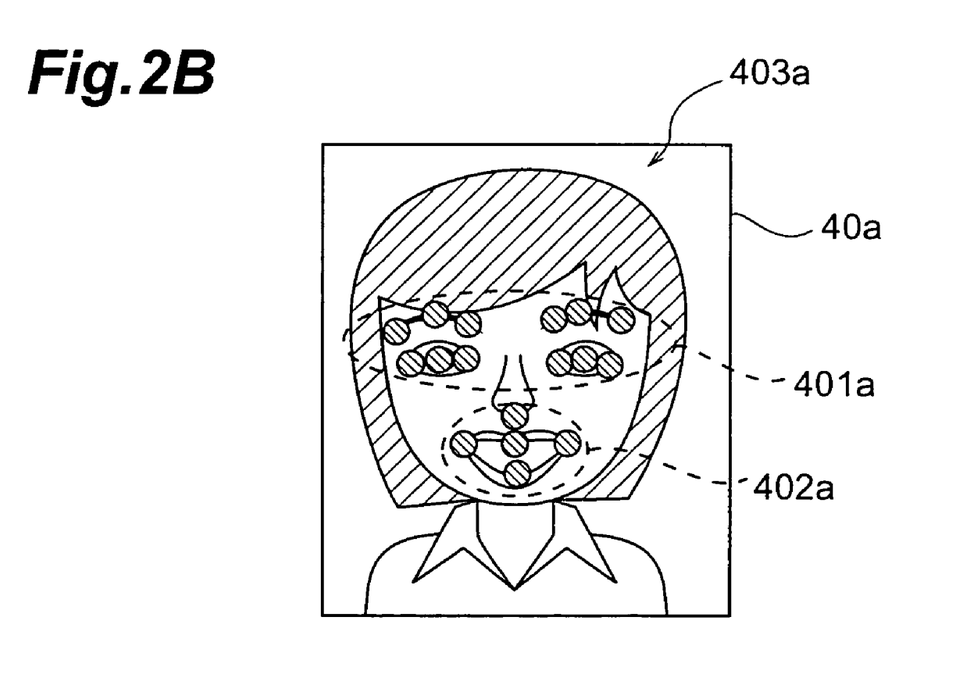
FIG. 2B shows an example of a face image acquired by a face information transmission system which is an aspect of this invention.

The first generation part 102 generates first image information identifying the positions of characteristic points of the face, based on an image acquired and output by the image acquisition part 101. More specifically, as shown in FIG. 2A, the first generation part 102 identifies characteristic points 401 identifying the eyes and eyebrows, and characteristic points 402 identifying the mouth and nose, in a face image 403 of the subject contained in an image 40 output by the image acquisition part 101, and generates the face image 403 and characteristic points 401, 402 as first image information of a still image. When images output by the image acquisition part 101 are moving images, the image 40 shown in FIG. 2A and an image 40a after a prescribed time has elapsed are received. As shown in FIG. 2B, the image 40a includes the face image 403a having moved during the lapse of a prescribed length of time, and the characteristic points 401a and 402a are identified in the face image 403a. Hence first image information in the case of moving images includes the face image 403 and characteristic points 401, 402, and the face image 403a and characteristic points 401a, 402a. The first generation part 102 outputs the first image information thus generated to the image judgment part 105.

The image judgment part 105 is a part which judges whether the first image information output by the first generation part 102 satisfies prescribed conditions. The prescribed conditions may be set appropriately using such factors as the circumstances and desires of the user using the mobile phone 10, or may be set appropriately according to requirements of the hardware of the mobile phone 10. As prescribed conditions, for example, inability to acquire a majority of the characteristic points contained in the first image information, or substantial deviation of the distribution of characteristic points in the face image, may be set as conditions. The image judgment part 105 outputs the result of judgment as to whether the first image information satisfies the prescribed conditions, together with the first image information, to the second generation part 107.

The utterance acquisition part 103 is a part which acquires utterances issued by the user, as the subject, of the mobile phone 10. The utterance acquisition part 103 outputs acquired utterances to the phoneme identification part 104.

The phoneme identification part 104 is a part which identifies phonemes corresponding to utterances acquired and output by the utterance acquisition part 103. A phoneme is the smallest unit of sound which may affect the meaning [of an utterance]. For example, if an output utterance is "konnnichiwa" ("hello")), then phonemes are identified as "ko (h)", "n (e)", "ni (l)", "chi (o)", "wa (u)". The phoneme identification part 104 outputs an utterance and identified phonemes to the phoneme judgment part 109.

The phoneme judgment part 109 is a part which judges whether a phoneme output by the phoneme identification part 104 satisfies prescribed conditions. The prescribed conditions may be set appropriately using such factors as the circumstances and desires of the user using the mobile phone 10, or may be set appropriately according to requirements of the hardware of the mobile phone 10. As prescribed conditions, for example, whether a phoneme can be identified or not may be set as a condition. The phoneme judgment part 109 outputs the results of judgment as to whether a phoneme satisfies the prescribed conditions, together with the utterance, to the second generation part 107.

The interrupt input part 106 receives an interrupt instruction input by the user of the mobile phone 10, and outputs the interrupt instruction to the second generation part 107. More specifically, when the user presses buttons to which are assigned instructions relating to such facial expressions as "laugh", "cry", or "be surprised", the corresponding instruction is input, and is output to the second generation part 107.

The second generation part 107 is a part which generates a character image (second image information) according to the facial expression of the face of the subject, based on the first image information generated by the first generation part 102. When the image judgment part 105 judges that the first image information satisfies the prescribed conditions, the second generation part 107 generates the character image according to the facial expression of the face of the subject based on, at least, the first image information; and when the first image information does not satisfy the prescribed conditions, but a phoneme identified by the phoneme identification part 104 satsfies prescribed conditions, [the second generation part 107] generates the character image according to the facial expression of the subject based on that phoneme.

When both the first image information and the phoneme satisfy the respective prescribed conditions, the second generation part 107 generates the character image based on the first image information and the phoneme. For example, in a case in which in the first image information only the inclination of the face can be acquired, when a phoneme has been identified, the two are used in a complementary manner to generate the character image. When neither the first image information nor the phoneme satisfy the respective prescribed conditions, the second generation part 107 generates a character image based on whether or not there is an utterance. For example, when an utterance exceeds a prescribed threshold, it is assumed that the user is speaking, and so an image of a speaking character is generated. Further, when neither the first image information nor the phoneme satisfy the respective prescribed conditions, and an utterance has not been acquired, image information stored in advance may be used as the character image.

Figure 3A:
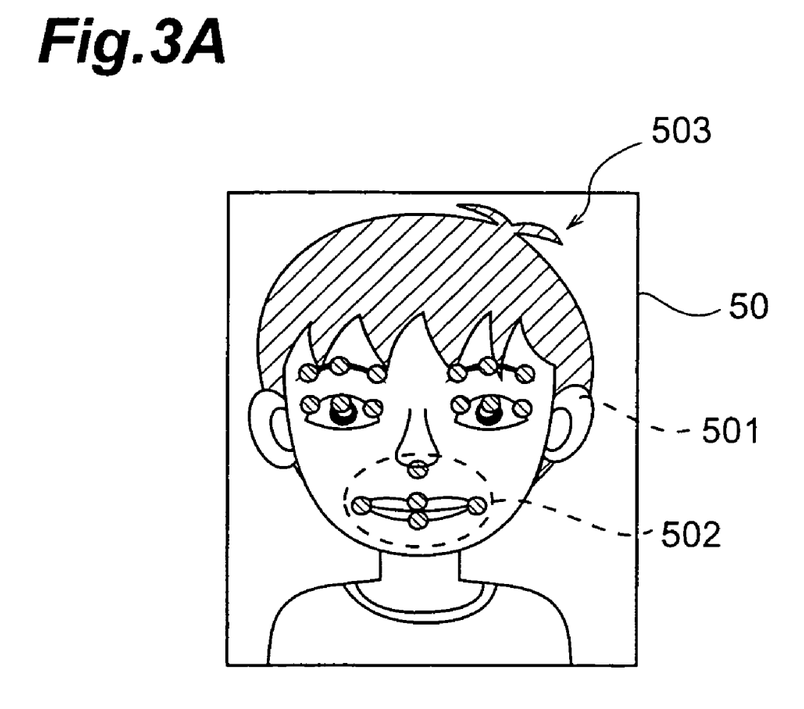
FIG. 3A shows an example of a character image generated by a face information transmission system which is an aspect of this invention.
Figure 3B:
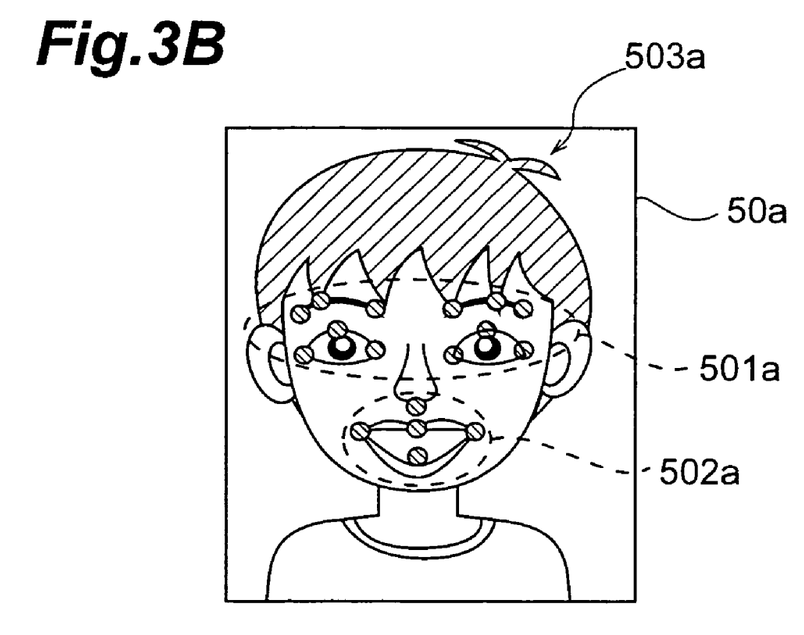
FIG. 3B shows an example of a character image generated by a face information transmission system which is an aspect of this invention.

When the second generation part 107 generates a character image based on first image information, when for example [image generation] is based on the face image 403 and characteristic points 401, 402 shown in FIG. 2A, the positions of the characteristic points 401, 402 relative to the face image 403 are identified as a distribution. Based on this distribution, the second generation part 107 determines the positions of the characteristic points 501, 502 relative to the character face image 503 as shown in FIG. 3A, and generates a still character image 50. When the first image information corresponds to a moving image, that is, when [image generation] is based on the face image 403 and characteristic points 401, 402 shown in FIG. 2A and on the face image 403a and characteristic points 401a, 402a after the lapse of a prescribed length of time as shown in FIG. 2B, in addition to the character image 50 shown in FIG. 3A, a character image 50a is generated based on the character face image 503a and characteristic points 501a, 502a shown in FIG. 3B.

Figure 4:
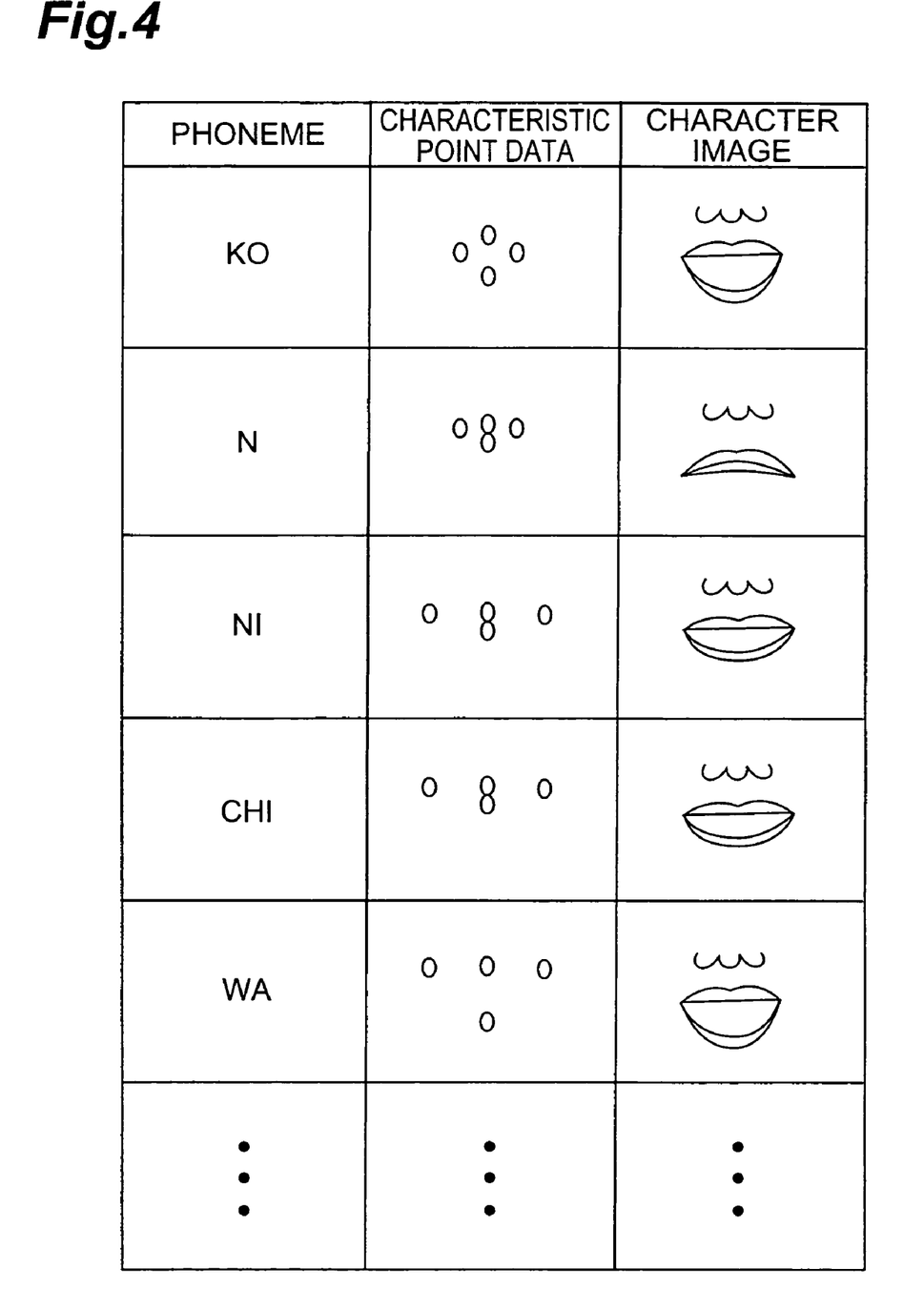
FIG. 4 shows an example of information stored in the character information storage part of FIG. 1.

When the second generation part 107 generates a character image based on a phoneme, information stored in the character information storage part 110 is utilized. FIG. 4 shows an example of information stored in the character information storage part 110. According to the example shown in FIG. 4, a "phoneme", "characteristic point data", and a "character image" are stored in association in the character information storage part 110. The second generation part 107 extracts the "characteristic point data" and "character image" corresponding to each "phoneme" and generates a character image as a still image or as a moving image. In the example shown in FIG. 4, an image in the mouth area is displayed; but the correspondence may be with an image of the entire face. Further, images incorporating peculiarities of the user may be stored as "character images". A "character image" incorporating peculiarities of the user are not limited to those based on "phonemes", and may be applied to cases in which character images are generated based on "first image information" or on "utterances" as well.

When an interrupt instruction is output from the interrupt input part 106, the second generation part 107 changes the character image according to the interrupt instruction. For example, when a "laugh" interrupt instruction is output, the generated character image is changed so as to assume a laughing facial expression. The second generation part 107 outputs the generated or changed character image to the transmission part 108.

The transmission part 108 transmits the character image generated by the second generation part 107 to the mobile phone 30.

Figure 5:
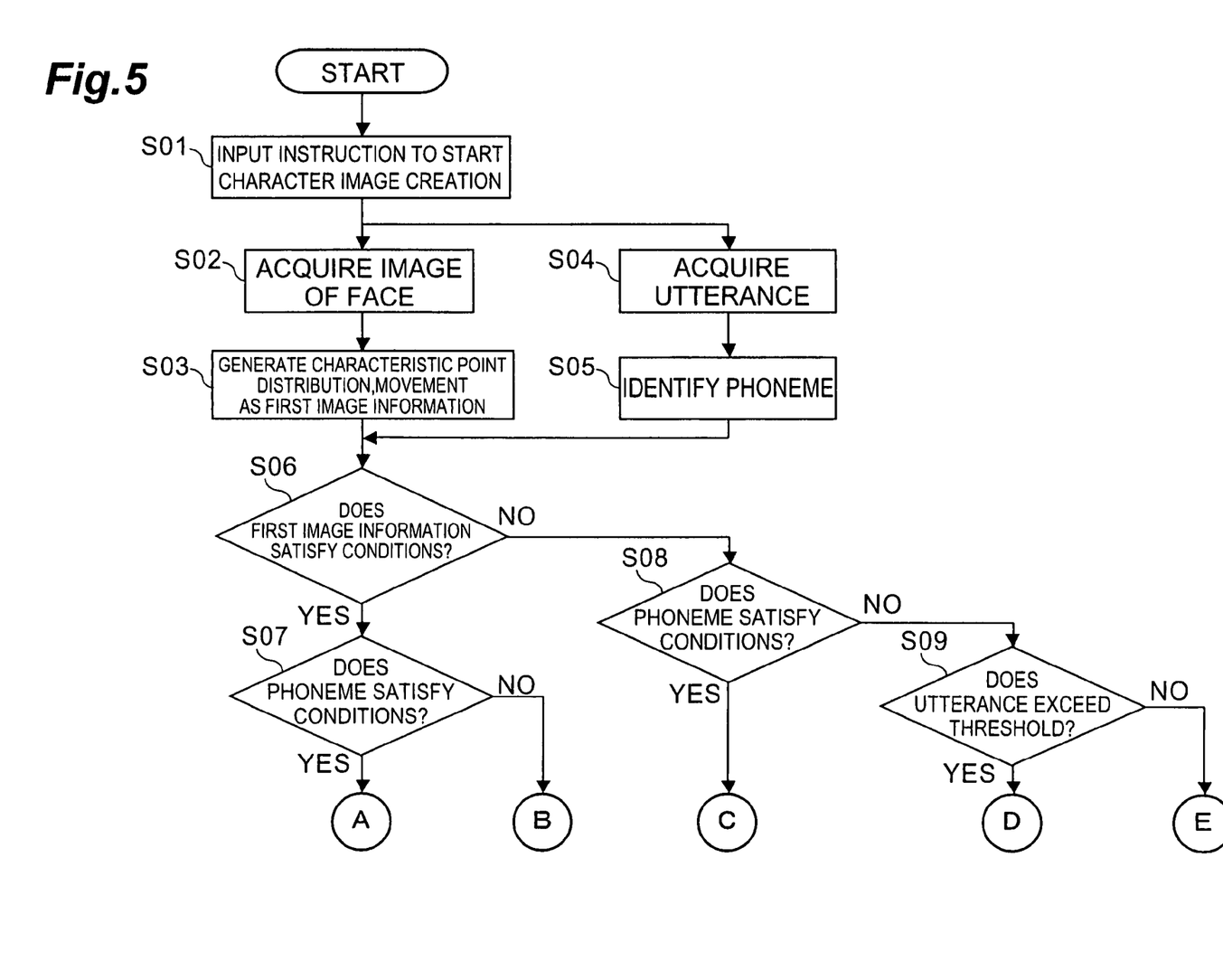
FIG. 5 is a flowchart showing the method of transmission of character images used by a face information transmission system which is an aspect of this invention.
Figure 6:
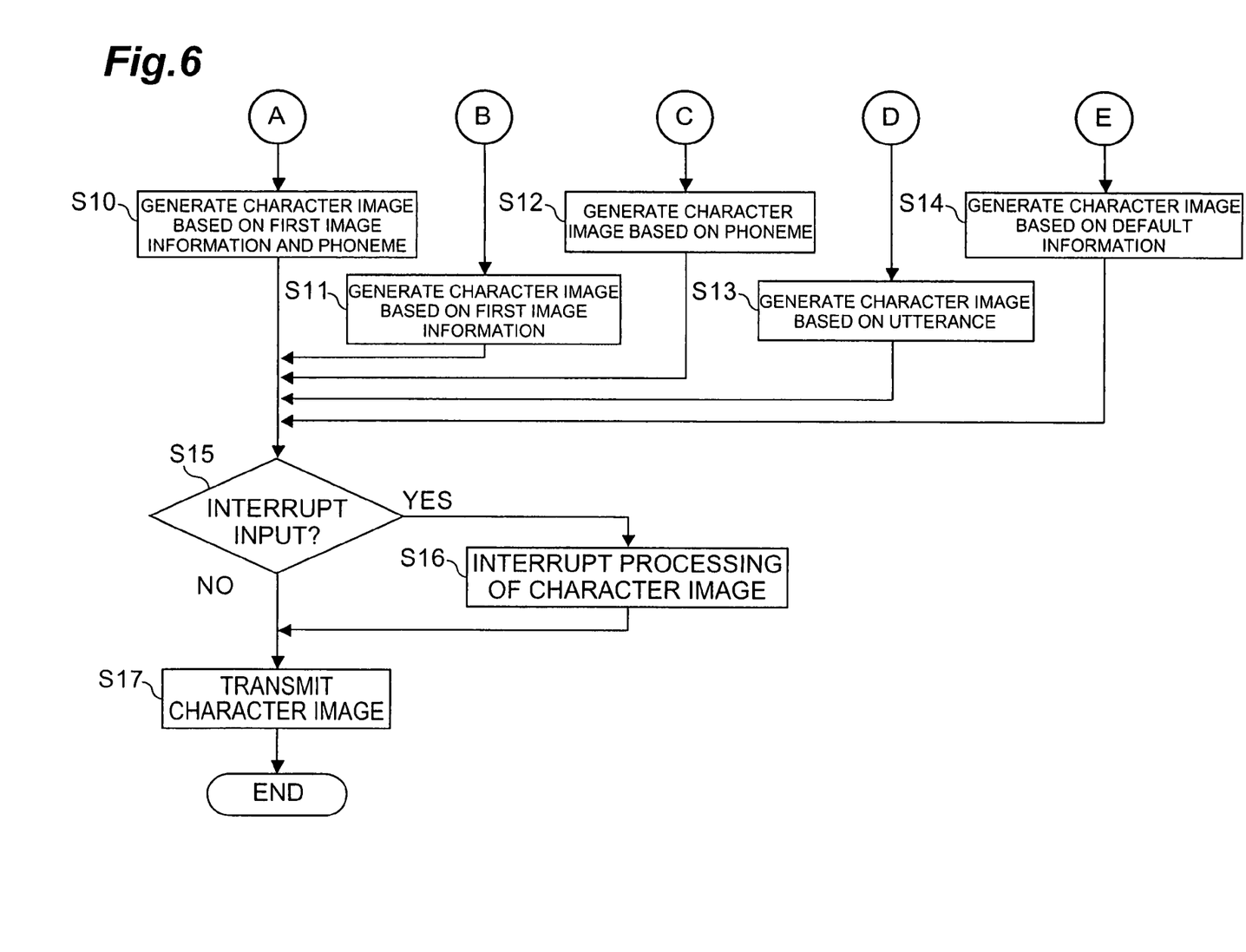
FIG. 6 is a flowchart showing the method of transmission of character images used by a face information transmission system which is an aspect of this invention; and, FIG. 7 is a drawing used to explain a face information transmission program which is an aspect of this invention.

Next, a method of transmission of a character image using the mobile phone 10 is explained, using the flowcharts of FIG. 5 and FIG. 6. The flowcharts of FIG. 5 and FIG. 6 form a series. The user inputs to the mobile phone 10 an instruction to create and transmit a character image. (step S01). In response to this input instruction, the operations of the steps S02, S03 and the steps S04, S05 explained next are performed in parallel.

The image acquisition part 101 acquires an image of the face of the user, as the subject, of the mobile phone 10 (step S02). The image acquisition part 101 outputs the acquired image to the first generation part 102. The first generation part 102 generates first image information, identifying the positions of characteristic points of the face, based on the image acquired and output by the image acquisition part 101 (step S03). The first generation part 102 outputs the generated first image information to the image judgment part 105.

The utterance acquisition part 103 is a part which acquires utterances issued by the user, as the subject, of the mobile phone 10 (step S04). The utterance acquisition part 103 outputs an acquired utterance to the phoneme identification part 104. The phoneme identification part 104 identifies phonemes corresponding to an utterance acquired and output by the utterance acquisition part 103 (step S05). The phoneme identification part 104 outputs the utterance and identified phonemes to the phoneme judgment part 109.

The image judgment part 105 judges whether first image information output by the first generation part 102 satisfies prescribed conditions (step S06). The image judgment part 105 outputs to the second generation part 107 the judgement result as to whether the first image information satisfies the prescribed conditions, together with the first image information.

The phoneme judgment part 109 judges whether a phoneme output by the phoneme identification part 104 satisfies prescribed conditions (steps S07, S08). Also, the phoneme judgment part 109 judges whether an utterance output by the phoneme identification part 104 is the state of a substantial utterance exceeding a prescribed threshold (step S09). The phoneme judgment part 109 outputs to the second generation part 107 the result of judgment as to whether the phoneme satisfies prescribed condition, the result of judgment as to whether the utterance exceeds the prescribed threshold, the utterance, and the phoneme.

When the first image information satisfies the prescribed conditions, and the phoneme also satisfies the prescribed conditions (from step S06 to step S07), the second generation part 107 generates a character image according to the facial expression of the face of the subject, based on the first image information and the phoneme (step S10).

When the first image information satisfies the prescribed conditions, and the phoneme does not satisfy the prescribed conditions (from step S06 to step S07), the second generation part 107 generates a character image according to the facial expression of the face of the subject, based on the first image information (step S11).

When the first image information does not satisfy the prescribed conditions, but the phoneme satisfies the prescribed conditions (from step S06 to step S08), the second generation part 107 generates a character image according to the facial expression of the face of the subject, based on the phoneme (step S12).

When the first image information does not satisfy the prescribed conditions, and the phoneme also does not satisfy the prescribed conditions, but the utterance exceeds the prescribed threshold (step S06, and from step S08 to step S09), the second generation part 107 generates a character image according to the facial expression of the face of the subject, based on the utterance (step S13).

When the first image information does not satisfy the prescribed conditions, and the phoneme also does not satisfy the prescribed conditions, and the utterance does not exceed the prescribed threshold (step S06, and from step S08 to step S09), the second generation part 107 generates a character image based on default information stored in advance (step S14).

The second generation part 107 judges whether an interrupt instruction has been output from the interrupt input part 106 (step S15). When an interrupt instruction has been output, the second generation part 107 changes the character image according to the interrupt instruction (step S16). The second generation part 107 outputs the generated or changed character image to the transmission part 108. The transmission part 108 transmits the character image generated by the second generation part 107 to the mobile phone 30 (step S17).

Figure 7:
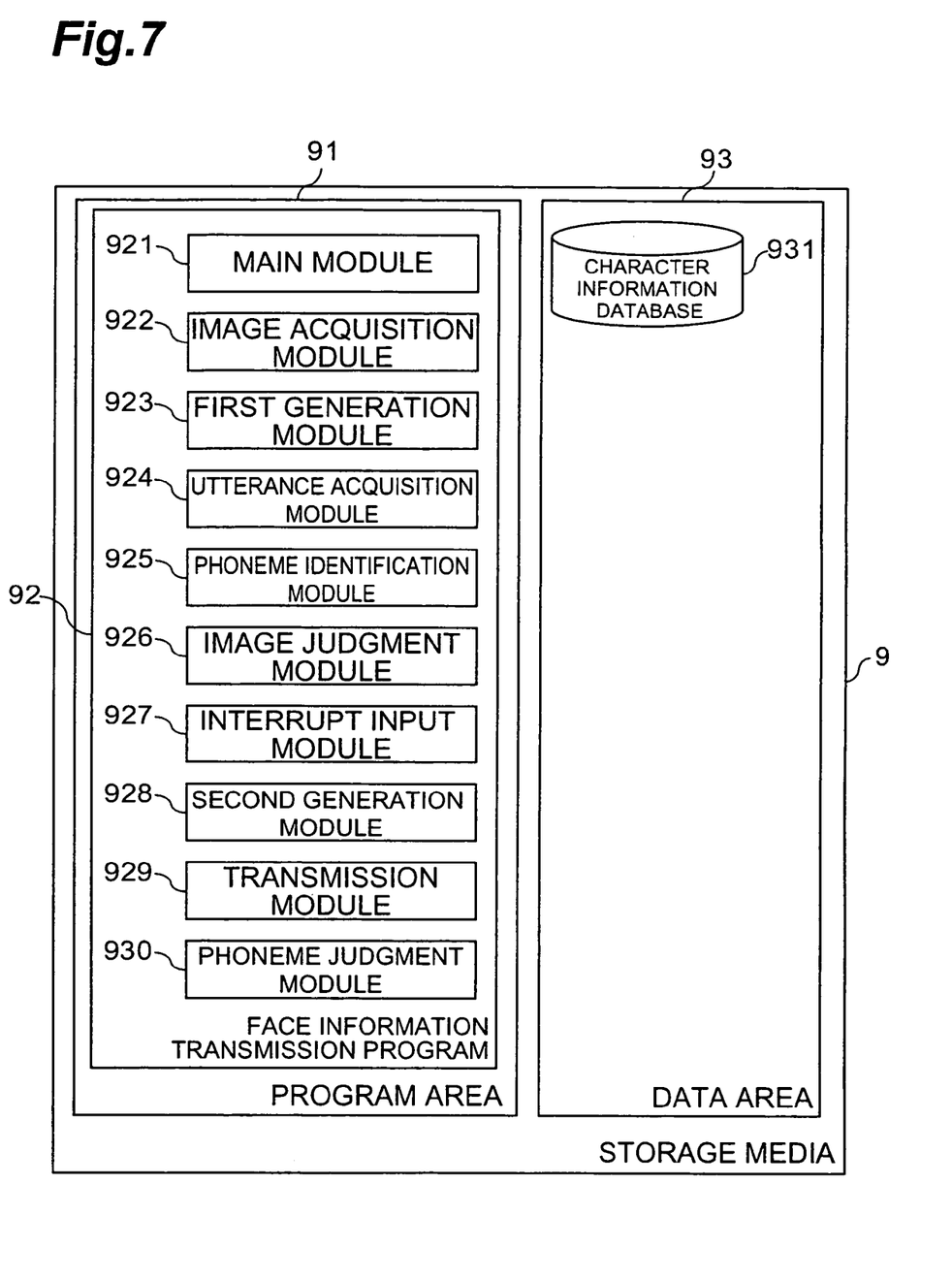

Next, a face information transmission program 92, which causes a computer capable of information communication and comprising a CPU (central processing unit), memory, input devices such as buttons and a microphone, a display device such as a liquid crystal display, an image acquisition device such as a camera, and similar to function as the mobile phone 10 of this aspect, as well as computer-readable recording media 9 on which [the program] is recorded, are explained. FIG. 7 shows the configuration of recording media 9 on which is recorded a face information transmission program 92. The recording media 9 may be, for example, a magnetic disk, optical disc, CD-ROM, or memory incorporated in a computer.

As shown in FIG. 7, the recording media 9 comprises a program area 91 which records the program, and a data area 93 which records data. In the data area 93 is stored a character information database 931 similar to the character information storage part 110 explained using FIG. 1.

The face information transmission program 92 is recorded in the program area 91. The face information transmission program 92 comprises a main module 921 which supervises processing; an image acquisition module 922; a first generation module 923; an utterance acquisition module 924; a phoneme identification module 925; an image judgment module 926; an interrupt input module 927; a second generation module 928; a transmission module 929; and a phoneme judgment module 930. Here, the functions realized through operation of the image acquisition module 922, first generation module 923, utterance acquisition module 924, phoneme identification module 925, image judgment module 926, interrupt input module 927, second generation module 928, transmission module 929, and phoneme judgment module 930 are similar to the respective functions of the image acquisition part 101, first generation part 102, utterance acquisition part 103, phoneme identification part 104, image judgment part 105, interrupt input part 106, second generation part 107, transmission part 108, and phoneme judgment part 109 of the above mobile phone 10.

In this aspect, a character image is generated according to the facial expression of the face of the subject, based on first image information generated based on the positions of characteristic points; hence image information which captures the facial expression of the face of the subject can be generated. A facial expression often reflects such elements as the feelings and intentions of the subject, and a character image can be generated as an image reflecting such elements and transmitted to the mobile phone 30.

In this aspect, when first image information does not satisfy prescribed conditions, a character image is generated according to the facial expression of the face of the subject based on a phoneme, so that even if for some reason measurement of the positions of characteristic points of the face of the subject is incomplete, a character image can still be generated.

In this aspect, first image information includes information identifying the distribution of characteristic points in the face of the subject; hence the relative positional relationships of characteristic points can be grasped, and a more appropriate character image can be generated.

In this aspect, first image information is generated based on displacements in the positions of characteristic points measured along a time series, so that changes in facial expression of the face of the subject can be grasped as changes in the positions of characteristic points. Hence character images can be generated according to changes in facial expression.

In this aspect, first image information includes information identifying the movement of characteristic points relative to the face of the subject, so that movement of characteristic points relative to the face can be identified along a time series, and changes in facial expression of the face of the subject can be grasped more accurately.

What is claimed is:

1. A face information transmission system, comprising:
   image acquisition means to acquire an image of a face of a subject;
   first generation means for generating first image information relating to said subject and including positions of characteristic points of said face, based on the acquired image;
   second generation means for generating second image information according to a facial expression of the face of said subject based on the generated first image information, said second image information being an image of a character that is different than said face of the subject;
   transmission means for transmitting the image of the character to a different communication terminal,
   utterance acquisition means for acquiring utterances issued by said subject; and
   image judgment means for judging whether or not said first image information satisfies prescribed conditions, wherein, when said image judgment means judges that said first image information satisfies prescribed conditions, said second generation means performs a first process for generating second image information according to the facial expression of the face of said subject based, at least, on said first image information, and when said image judgment means judges that said first image information does not satisfy prescribed conditions, said second generation means performs a second process for generating second image information according to the facial expression of the face of said subject based on said utterances, said second process being a different computer-implemented process than said first process and does not use information regarding the positions of characteristic points of said face.

2. The face information transmission system according to claim 1, further comprising:

phoneme identification means for identifying phonemes corresponding to an utterance acquired by said utterance acquisition means; and phoneme judgment means for judging whether an identified phoneme satisfies prescribed conditions, wherein, when said phoneme judgment means judges that said phoneme satisfies prescribed conditions, said second generation means generates second image information according to the facial expression of the face of said subject based, at least, on said phoneme, and when said phoneme judgment means judges that said phoneme does not satisfy prescribed conditions, said second generation means generates second image information according to the facial expression of the face of said subject based on said first image information.

3. The face information transmission system according to claim 2, wherein, when neither said first image information nor said phoneme satisfies the respective prescribed conditions and said utterance cannot be acquired, said second generation means employs image information determined in advance as said second image information.

4. The face information transmission system according to claim 1, wherein said first image information comprises information to identify the distribution of said characteristic points in the face of said subject.

5. The face information transmission system according to claim 1, wherein said image acquisition means acquires images of said face along a time series, and said first generation means generates said first image information including displacements in the positions of said characteristic points along a time series based on the acquired images.

6. The face information transmission system according to claim 5, wherein said first image information includes information to identify the movement of said characteristic points relative to the face of said subject.

7. A face information transmission system, comprising:

an image acquisition mechanism configured to acquire an image of a face of a subject;

a first generation mechanism configured to generate first image information relating to said subject and including positions of characteristic points of said face, based on the acquired image;

a second generation mechanism configured to generate second image information according to a facial expression of the face of said subject based on the generated first image information, said second image information being an image of a character that is different than said face of the subject;

a transmission mechanism configured to transmit the image of the character to a different communication terminal;

an utterance acquisition mechanism configured to acquire utterances issued by said subject; and an image judgment mechanism configured to judge whether or not said first image information satisfies prescribed conditions, wherein, when said image judgment mechanism judges that said first image information satisfies prescribed conditions, said second generation mechanism performs a first process to generate second image information according to the facial expression of the face of said subject based, at least, on said first image information, and when said image judgment mechanism judges that said first image information does not satisfy prescribed conditions, said second generation mechanism performs a second process to generate second image information according to the facial expression of the face of said subject based on said utterances, said second process being a different computer-implemented process than said first process and does not use information regarding the positions of characteristic points of said face.

8. The face information transmission system according to claim 7, further comprising:

a phoneme identification mechanism configured to identify phonemes corresponding to an utterance acquired by said utterance acquisition mechanism; and a phoneme judgment mechanism configured to judge whether an identified phoneme satisfies prescribed conditions, wherein, when said phoneme judgment mechanism judges that said phoneme satisfies prescribed conditions, said second generation mechanism generates second image information according to the facial expression of the face of said subject based, at least, on said phoneme, and when said phoneme judgment mechanism judges that said phoneme does not satisfy prescribed conditions, said second generation mechanism generates second image information according to the facial expression of the face of said subject based on said first image information.

9. The face information transmission system according to claim 8, wherein, when neither said first image information nor said phoneme satisfies the respective prescribed conditions and said utterance cannot be acquired, said second generation mechanism employs image information determined in advance as said second image information.

10. The face information transmission system according to claim 7, wherein said first image information comprises information to identify the distribution of said characteristic points in the face of said subject.

11. The face information transmission system according to claim 7, wherein said image acquisition mechanism acquires images of said face along a time series, and said first generation mechanism generates said first image information including displacements in the positions of said characteristic points along a time series based on the acquired images.

12. The face information transmission system according to claim 11, wherein said first image information includes information to identify the movement of said characteristic points relative to the face of said subject.

13. The system of claim 1, wherein said second generation means performs said second process without using said first image information.

14. The system of claim 13, wherein said second generation means only uses information about said utterances as input data for said second process.

15. A computer-implemented method, comprising steps of:
- acquiring and storing in memory information of a facial expression of a face of a subject;
- acquiring and storing in memory information of an utterance;
- analyzing the information of the facial expression;
- analyzing the information of the utterance;
- generating character image information of a character image based at least said information of the facial expression according to a first process when the information of the facial expression satisfies predetermined conditions, said character image being different than said face of the subject;
- generating the character image information based at least on said information of an utterance using a second process that is different from the first process when the information of the facial expression does not satisfy predetermined conditions, said second process does not use information regarding the positions of characteristic points of the face; and
- transmitting the character image information.

16. The method according to claim 15, wherein:
the second process does not use as input the information of the facial expression.

17. A method according to claim 16, wherein:
the second process uses as input only the information of the utterance.

18. The method according to claim 15, further comprising:
- inputting instruction information from a user indicating a facial expression;
- generating information corresponding to the character image, using the instruction information; and
- transmitting the information corresponding to the character image that was generated using the instruction information.

19. The method according to claim 15, wherein:
the inputting of instruction information inputs instruction information corresponding to at least one of laughing, crying, and surprise.

* * * * *